June 22, 1937.  S. JENCICK  2,084,809
AUTOMOBILE CHASSIS
Filed July 19, 1934  3 Sheets-Sheet 1
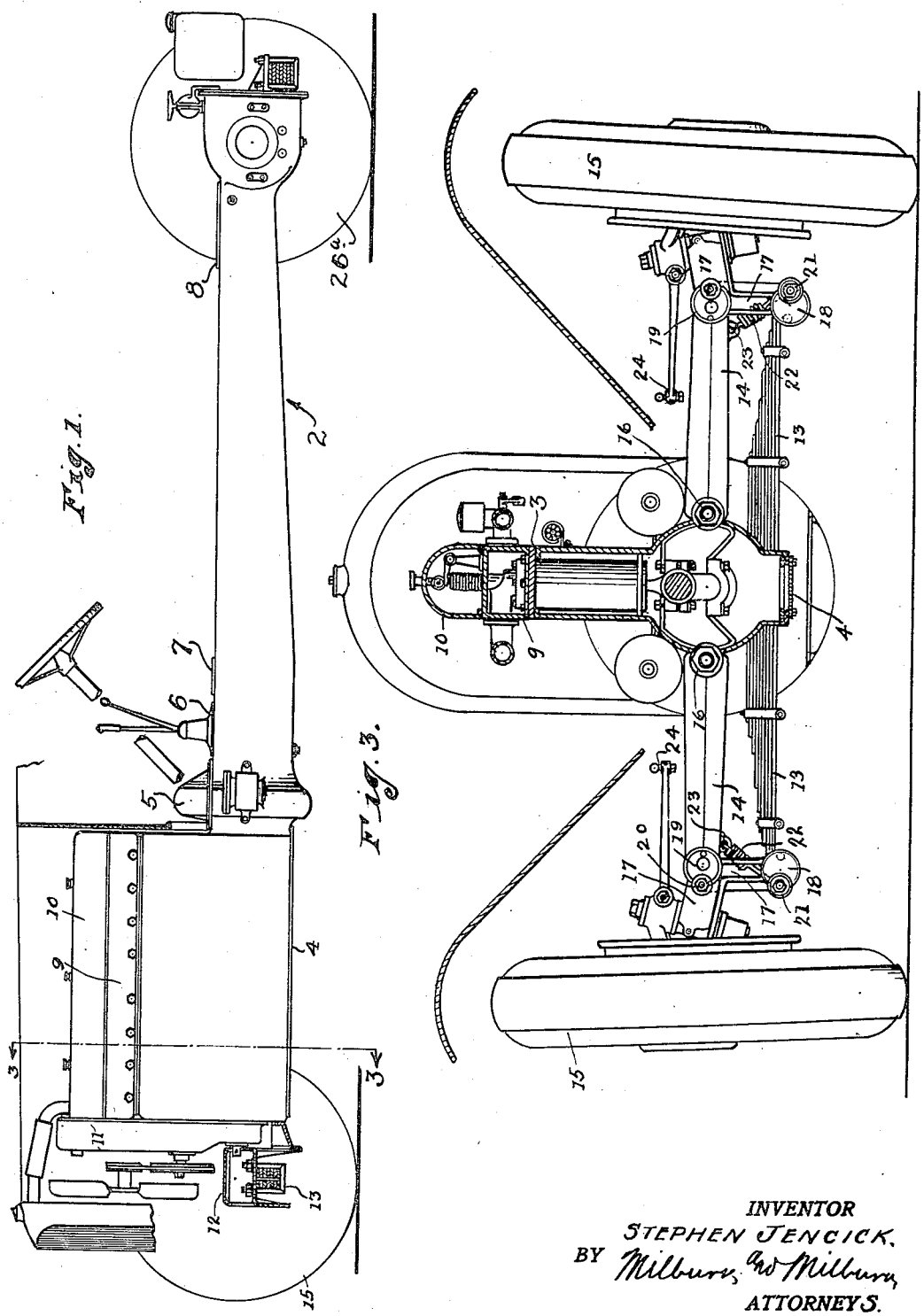
INVENTOR
STEPHEN JENCICK.
BY Milbury and Milbury
ATTORNEYS.

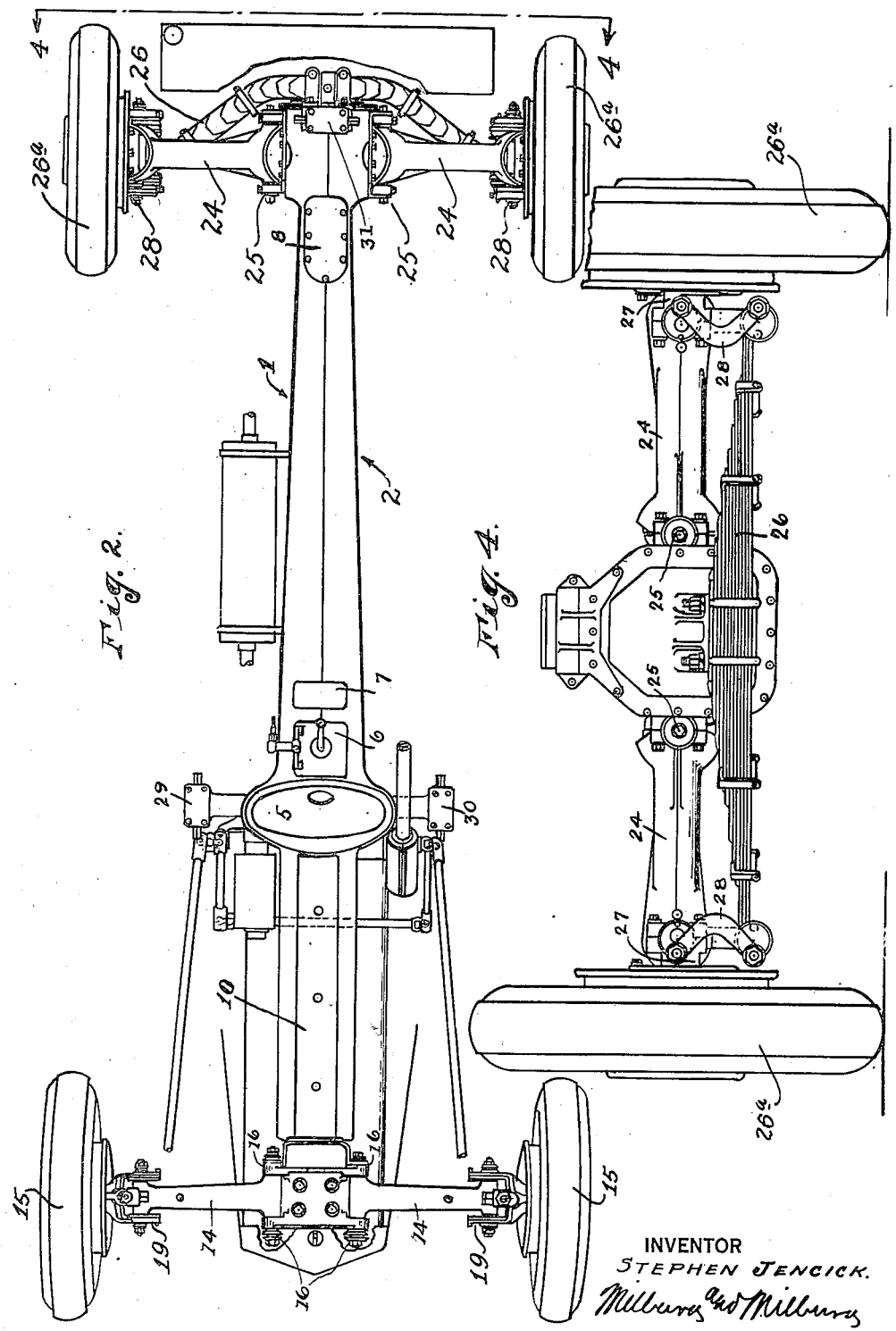

June 22, 1937.  S. JENCICK  2,084,809
AUTOMOBILE CHASSIS
Filed July 19, 1934  3 Sheets-Sheet 3
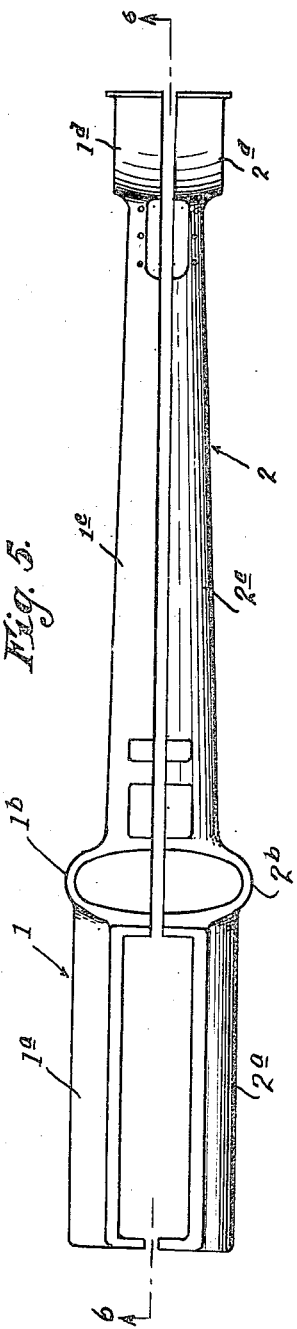
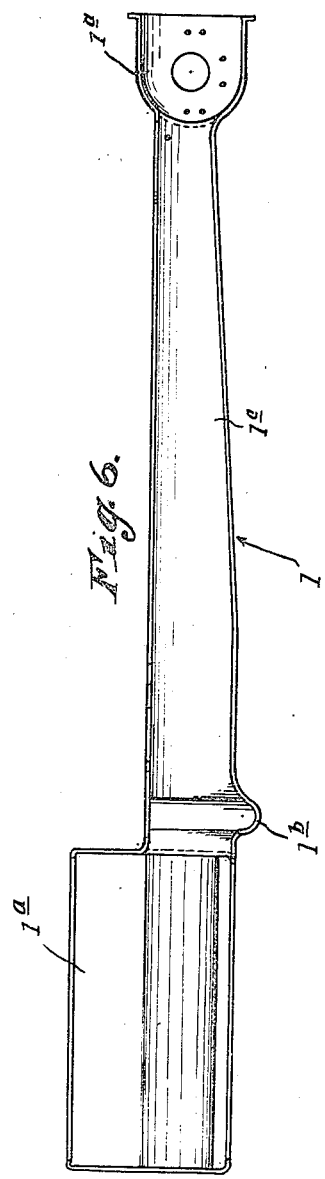
INVENTOR
STEPHEN JENCICK.
BY Milburn and Milburn
ATTORNEYS.

Patented June 22, 1937

2,084,809

UNITED STATES PATENT OFFICE 2,084,809

AUTOMOBILE CHASSIS

Stephen Jencick, Chagrin Falls, Ohio, assignor to Thompson Products, Inc., Cleveland, Ohio, a corporation Application July 19, 1934, Serial No. 736,051

3 Claims. (Cl. 180—54)

This invention relates to an improved chassis construction for an automobile.

Due to the recent development of automobile engines of increased power and speed, the chassis has been greatly strengthened and made heavier but without materially changing the weight of the body of the automobile. This situation is found especially in automobiles of the lower and middle classes although it exists to some extent in most of them. The result is that there is a lack of balance between the weight and rigidity of the chassis and body, and the body is not able to withstand the stress and strain to which it is subjected. Consequently the body suffers from considerable vibration. Also, there is more or less dead weight in the chassis and such a chassis is comparatively expensive to build.

The object of the present invention is to remedy this situation by devising a chassis which is even stronger than those now in vogue and yet is of lighter weight and hence better balanced with respect to the body of the automobile and is considerably less expensive to build.

Other objects will appear from the following description and claims when considered together with the accompanying drawings.

Fig. 1 is a side elevation of an automobile chassis embodying my invention;

Fig. 2 is a plan view of the same;

Fig. 3 is a view taken on line 3—3 of Fig. 1;

Fig. 4 is a view corresponding to line 4—4 of Fig. 2;

Fig. 5 is a plan view of the two halves of the middle part of the chassis prior to being welded together; and Fig. 6 is a view corresponding to line 6—6 of Fig. 5.

The chassis embodying my invention, as herein set forth, may be recognized in a general way as being of a substantially H-form, comprising a medial longitudinally extending portion and transversely disposed end portions. The medial and transverse portions are all of hollow form and serve also as housings for the operating mechanism.

The medial portion is formed from two companion right and left hand halves 1 and 2 which are pressed out of sheet metal of the proper gauge. These pressed members which are of semi-tubular form, are welded together along the top and bottom, that is, through a vertical plane. These two companion parts are shaped so as to supplement each other in providing housing for the several parts of the mechanism including the engine, transmission, drive shaft and differential. These portions of the hollow body are indicated by reference numerals $1^a$ and $2^a$, $1^b$ and $2^b$, $1^c$ and $2^c$, and $1^d$ and $2^d$, respectively, as they appear in the supplemental halves 1 and 2.

The top of the portions $1^a$—$2^a$ are cut away at their adjacent edges so as to provide an opening over which is welded the plate 3 provided with apertures corresponding to the individual cylinders. The bottom of the portions $1^a$—$2^a$ are also cut away so as to provide an opening which is closed by the removable plate 4 so as to permit access therethrough to the crank case. The crank shaft and bearings therefor are housed within the space afforded by these supplemental portions $1^a$ and $2^a$.

Likewise, the adjacent edges of the members 1 and 2 are cut away so as to provide openings to the interior thereof at several points therealong as required for access to the operating mechanism housed therewithin. These openings are also closed by removable plates 5, 6, 7, and 8, respectively.

It will be observed that the front ends of the companion members 1 and 2 are closed whereas their rear ends are open so as to permit insertion and assembly of the operating mechanism. The rear end is closed by a plate which, like the other removable plates, is bolted in place. Any other necessary or desirable openings might also be provided in the same manner as those above referred to, wherever required.

The manifold 9 is bolted on top of the plate 3 and the head 10 is removably fastened on top of the manifold 9 by means of screw bolts. Suitable openings are provided for the necessary connections. Likewise, the gear casing 11 is suitably mounted and at the front thereof there is provided the bracket 12 upon the under side of which is suspended the transversely extending leaf spring 13. Upon the opposite sides of the bracket 12 are mounted the laterally extending hollow supports 14 for the front wheels 15.

The supports 14 may also be formed from companion halves pressed out of sheet metal and welded together through a horizontal plane, as indicated in Fig. 3, or these supports may be formed from halves welded through the vertical plane.

The supports 14 are pivotally connected to the bracket 12, as indicated by reference numeral 16, and the brackets 17 which carry the wheels, are pivotally mounted upon the outer ends of the supports 14 so as to permit individual action of each wheel in a vertical plane. The particular form of means for suspending the wheels so as to be capable of individual automatic adjustment in accordance with the surface of the road is not to be regarded as a part of the invention claimed herein and it is therefore illustrated only in a general way. But the present invention does comprehend the combination of my improved chassis and an independently acting wheel-suspension means.

The automatic compensating or adjusting means for the individual action of the wheels will be here referred to only in a general way and, as indicated in the drawings, is in each case arranged between the end of the spring 13 and the point of pivotal connection of the wheel bracket 17 and the support 14.

The individually acting suspension means here illustrated comprises a pair of eccentrics 18 and 19 mounted upon the ends of the member 14 and the spring 13, respectively, the bracket 17, which is of angular form, surrounding these eccentrics so as to be controlled thereby. These eccentrics are mounted at the points 20 and 21 upon the arm 14 and spring 13, respectively, and the coil spring 22 is connected at its one end to the point 21 and at its other end to the support 14 at the point 23. The steering connection is indicated at 24.

Briefly, the upward or downward movement of the wheel due to an elevation or depression in the road, will be accompanied by corresponding movement of the support 14 and that part of the spring 13 immediately there-beneath, and the action of the eccentrics will cause the bracket 17 to adjust itself so as to compensate for the irregularity in the road surface without however changing the position or level of the automobile body or the rest of the chassis. Neither is there any change in the vertical plane of the wheel. Virtually the support 14 is automatically extended so as to obtain the necessary variation in the distance from the point 16 to the wheel tread. The result is that there will not be any disturbance transmitted to the main part of the chassis on account of irregularities in the road surface, and the body of the automobile is likewise unaffected by any such uneven roadway. Also, the wear and tear upon the tires is considerably reduced.

As above stated, no claim is to be made to this particular form of individually acting wheel-suspension means in this application, but it has been explained briefly so that there may be a full and clear understanding of the significance of the present improved chassis which may be employed with considerable advantage in connection with a wheel-suspension means of this general type. It is to be understood that, so far as the present improved chassis is concerned, there may be employed other specific mechanisms for individual wheel-suspension, as for instance that disclosed in my co-pending application executed of even date herewith and bearing Serial No. 736,050 and filing date of July 19, 1934.

The laterally extending housings 24 for the rear axles may also be formed by welding together companion pressed sheet metal members in the same manner as the front supports 14. The housings 24 are pivotally mounted at 25 upon the sides of the differential portion 1$^d$—2$^d$ of the main housing.

The rear leaf spring 26 which is mounted upon the rear end of the main housing has its ends located directly beneath the end portions of the auxiliary housings 24.

The rear wheels 26$^a$ have their brackets 27 pivotally mounted at the ends of the housings 24 and are provided with automatically and individually adjustable means so as to compensate for any irregularities in the road surface in the same manner as the front wheels. The means of individual suspension for the rear wheels differs somewhat from that described for the front wheels but the general operation is the same and other forms of such mechanism may be adopted, as for instance that shown in my co-pending application above referred to. The suspension mechanism for the rear wheels comprises the use of eccentrics and link and is indicated in a general way by reference numeral 28 and is arranged between the end of the spring 26 and the end of the housing 24.

The rear axles are provided with suitable joints at the points corresponding to the pivotal connections 25 of the housings 24 and at the points corresponding to the pivotal mounting of the brackets 27 of the wheels.

The body of the automobile is mounted at the three points 29, 30, and 31, the supports 29 and 30 being provided upon the laterally extending arms affixed to the sides of the main part 1 of the chassis.

Thus, with individually acting suspension means for all four wheels, both the chassis and body of the automobile will be relieved of vibration and twisting and straining to which they have heretofore been subjected. Consequently, the chassis may be reduced in weight and a better balance obtained between the weights of the chassis and body. If the individually acting wheel-suspension means should be provided for the front wheels only, still there would be realized a like beneficial result in corresponding measure.

In any event, whether the individual suspension means be employed at all, my improved form of chassis possesses increased strength to better withstand shock, stress and strain of all kinds, especially vibration and twisting action to which it might be subjected under any and all adverse conditions. At the same time, my present chassis is of greatly reduced weight and hence affords a more nearly true and proper balance with respect to the weight of the body of the automobile. Thus, the body is likewise relieved of a great deal of vibration and other forms of strain to which it has heretofore been subjected as a result of the unbalanced condition. Furthermore, my present chassis involves the use of considerably less material and hence is less expensive to build. Also, the cost of repair and replacement of parts of the chassis and throughout the entire automobile structure is greatly reduced.

What I claim is:

1. An automobile chassis consisting primarily of a substantially H-shaped frame, the middle portion thereof comprising right and left hand complementary hollow members secured together along a longitudinal joint and forming the longitudinal medial part of the chassis and enclosing the engine cylinder, crankcase, transmission, drive shaft and differential, and the cross portions thereof forming the ends of the chassis.

2. An automobile chassis consisting primarily of a substantially H-shaped frame, the middle portion thereof comprising longitudinal sheet metal hollow halves welded together so as to form a unitary, hollow body throughout substantially the entire length of the chassis, and constituting the longitudinal medial part of the chassis for the drive mechanism, and the cross portions thereof, each comprising sheet metal hollow halves welded together and forming the front and rear axle portions of the chassis.

3. An automobile chassis consisting primarily of a substantially H-shaped frame, the middle portion thereof comprising longitudinal sheet metal hollow halves welded together through a vertical plane so as to form a unitary, hollow body throughout so as to constitute the longitudinal medial part of the chassis and enclosing the engine cylinder, crankcase, transmission, drive shaft, and differential, and the cross portions thereof, each comprising sheet metal hollow halves welded together and forming the front and rear axle portions of the chassis.

STEPHEN JENCICK.